United States Patent
Kim et al.

(10) Patent No.: US 11,023,016 B2
(45) Date of Patent: Jun. 1, 2021

(54) HINGED DEVICE AND ASSOCIATED INPUT DEVICE

(71) Applicant: Microsoft Technology Licensing, LLC, Redmond, WA (US)

(72) Inventors: Young S. Kim, Bellevue, WA (US); Scott D. Schenone, Seattle, WA (US); Timothy G. Escolin, Seattle, WA (US); Panos C. Panay, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/058,783

(22) Filed: Aug. 8, 2018

(65) Prior Publication Data

US 2020/0050243 A1    Feb. 13, 2020

(51) Int. Cl.
*G06F 1/16* (2006.01)

(52) U.S. Cl.
CPC .......... *G06F 1/1681* (2013.01); *G06F 1/1671* (2013.01)

(58) Field of Classification Search
CPC .... G06F 1/1616; G06F 1/1681; G06F 1/1669; G06F 1/1671
USPC ........................................ 361/679.17, 679.27
See application file for complete search history.

(56) References Cited

U.S. PATENT DOCUMENTS

| | | | |
|---|---|---|---|
| 6,256,192 B1 * | 7/2001 | Shannon | G06F 1/1616 312/223.2 |
| 6,643,124 B1 * | 11/2003 | Wilk | G06F 1/1616 312/223.1 |
| 9,880,585 B2 | 1/2018 | Xin et al. | |
| 10,254,803 B1 * | 4/2019 | Quinn | G06F 1/1669 |
| 10,564,674 B2 * | 2/2020 | Fujimoto | G06F 1/1652 |
| 2002/0085337 A1 * | 7/2002 | Rubenson | G06F 1/1616 361/679.09 |
| 2002/0141146 A1 * | 10/2002 | Mustoe | G06F 1/1616 361/679.04 |
| 2003/0021082 A1 * | 1/2003 | Lu | G06F 1/1616 361/679.4 |
| 2003/0100263 A1 * | 5/2003 | Tanaka | G06F 1/1616 455/41.1 |
| 2004/0108968 A1 * | 6/2004 | Finke-Anlauff | G06F 1/1616 345/1.1 |
| 2004/0190239 A1 * | 9/2004 | Weng | G06F 1/1616 361/679.2 |
| 2004/0259593 A1 * | 12/2004 | Wang | G06F 1/1616 455/556.1 |

(Continued)

OTHER PUBLICATIONS

"International Search Report and Written Opinion Issued in PCT Application No. PCT/US2019/038808", dated Sep. 26, 2019, 11 Pages.

*Primary Examiner* — Hung S. Bui
*Assistant Examiner* — Sagar Shrestha
(74) *Attorney, Agent, or Firm* — Rainier Patents, P.S.

(57) ABSTRACT

The description relates to hinged devices, such as hinged computing devices and associated input devices. One example can include first and second device portions and a hinge assembly rotatably securing the first portion and the second portion through a range of orientations. This example can also include a wedge-shaped input device extending between a first end having a first thickness and a second end having a second greater thickness. In a closed orientation the first and second portions simultaneously contact the first end and the second end.

26 Claims, 6 Drawing Sheets

(56) References Cited

U.S. PATENT DOCUMENTS

| | | | | |
|---|---|---|---|---|
| 2006/0139862 A1* | 6/2006 | Wang | ............... | G06F 1/1616 |
| | | | | 361/679.3 |
| 2008/0117572 A1* | 5/2008 | Maatta | ............. | G06F 1/1616 |
| | | | | 361/679.15 |
| 2011/0026210 A1* | 2/2011 | Tracy | ............... | G06F 1/1616 |
| | | | | 361/679.17 |
| 2014/0254079 A1* | 9/2014 | Yang | ............... | G06F 1/1632 |
| | | | | 361/679.09 |
| 2014/0301028 A1* | 10/2014 | Huang | ............... | G06F 1/162 |
| | | | | 361/679.06 |
| 2015/0015492 A1 | 1/2015 | Lee | | |
| 2015/0227174 A1* | 8/2015 | Byquist | ............ | G06F 1/1618 |
| | | | | 361/679.55 |
| 2015/0338883 A1* | 11/2015 | Farahani | ........ | G06F 1/1656 |
| | | | | 361/679.1 |
| 2015/0378397 A1* | 12/2015 | Park | ............... | G06F 1/1652 |
| | | | | 361/679.27 |
| 2016/0139629 A1 | 5/2016 | Yeo | | |
| 2018/0164855 A1 | 6/2018 | Tazbaz et al. | | |
| 2019/0212781 A1* | 7/2019 | Fujimoto | ......... | G06F 1/1641 |
| 2019/0220061 A1* | 7/2019 | Fujimoto | ......... | G06F 1/1618 |

\* cited by examiner

HINGED DEVICE AND ASSOCIATED INPUT DEVICE

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced. Where space permits, elements and their associated reference numbers are both shown on the drawing page for the reader's convenience. Otherwise, only the reference numbers are shown.

DESCRIPTION

The present concepts relate to devices, such as computing devices employing hinge assemblies that can rotationally secure first and second device portions. The computing devices can employ an associated input device to augment user interactions and to ultimately enhance the user experience. The input devices can have a wedge-shaped profile that allows the first and second portions to be closed on the input device without damaging the device or the input device (e.g., wedge-shaped input device).

Figure 1A:
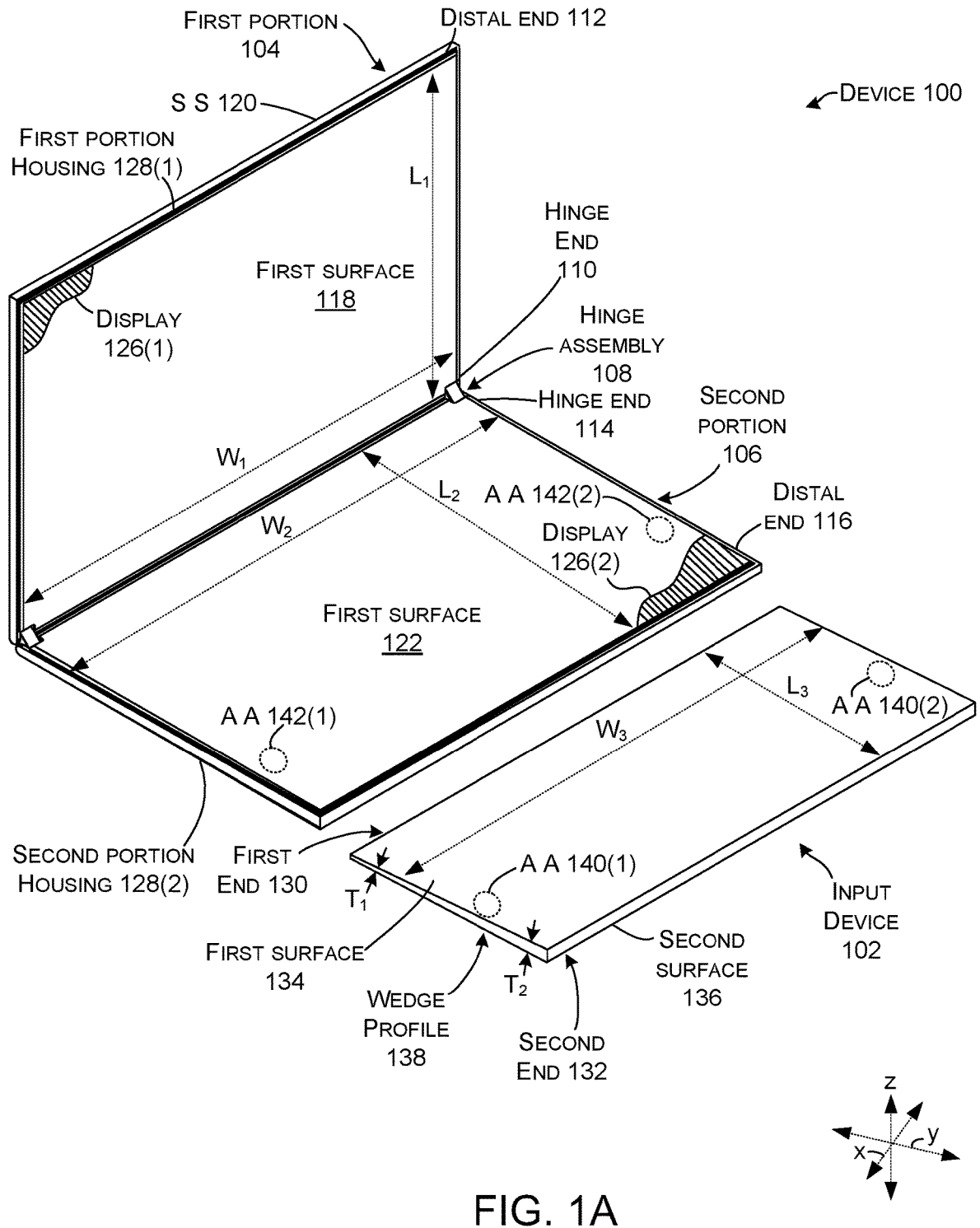
FIGS. 1A-1C show perspective views of example devices and associated wedge-shaped input devices in accordance with some implementations of the present concepts.
Figure 1B:
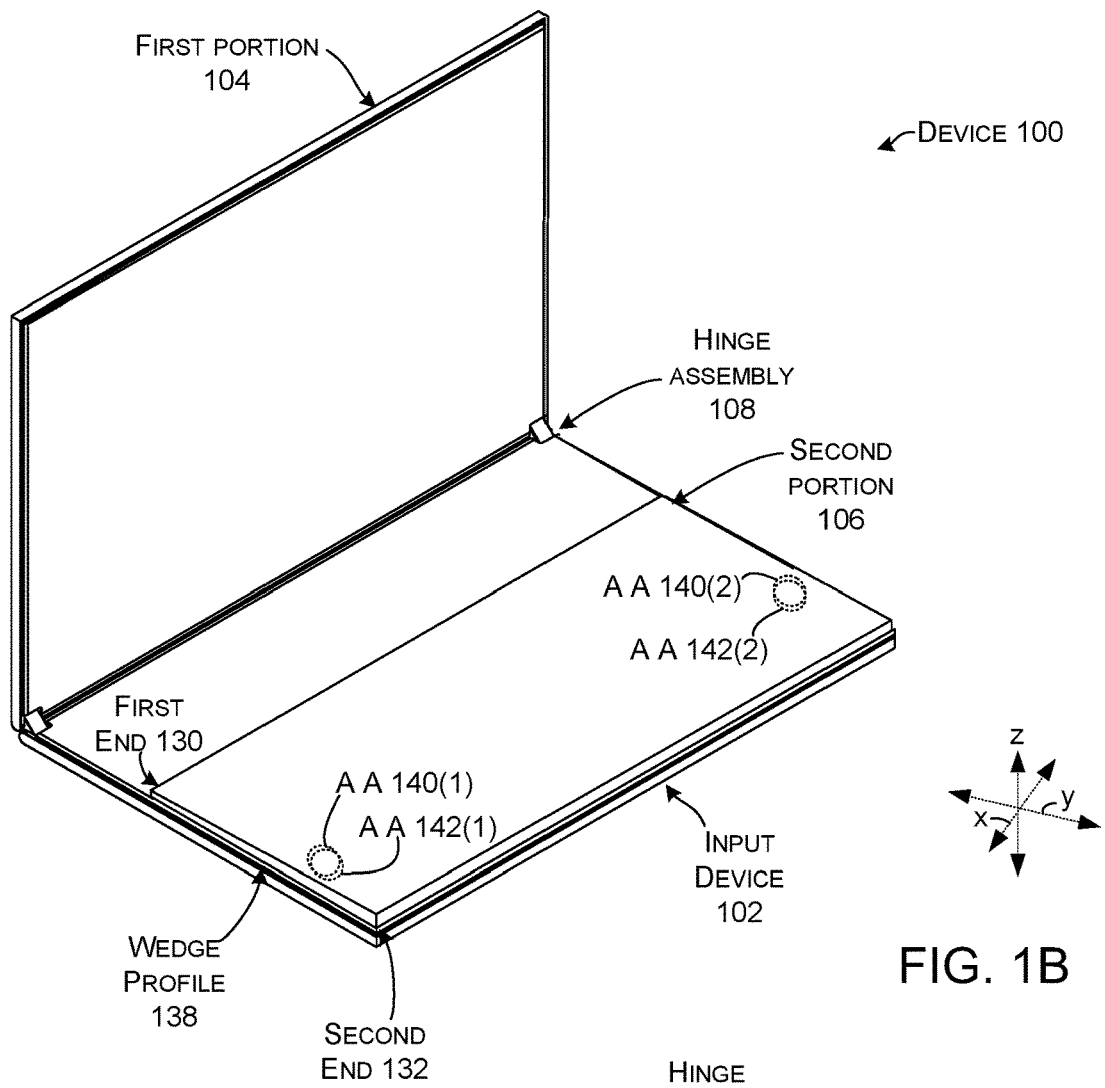
Figure 1C:
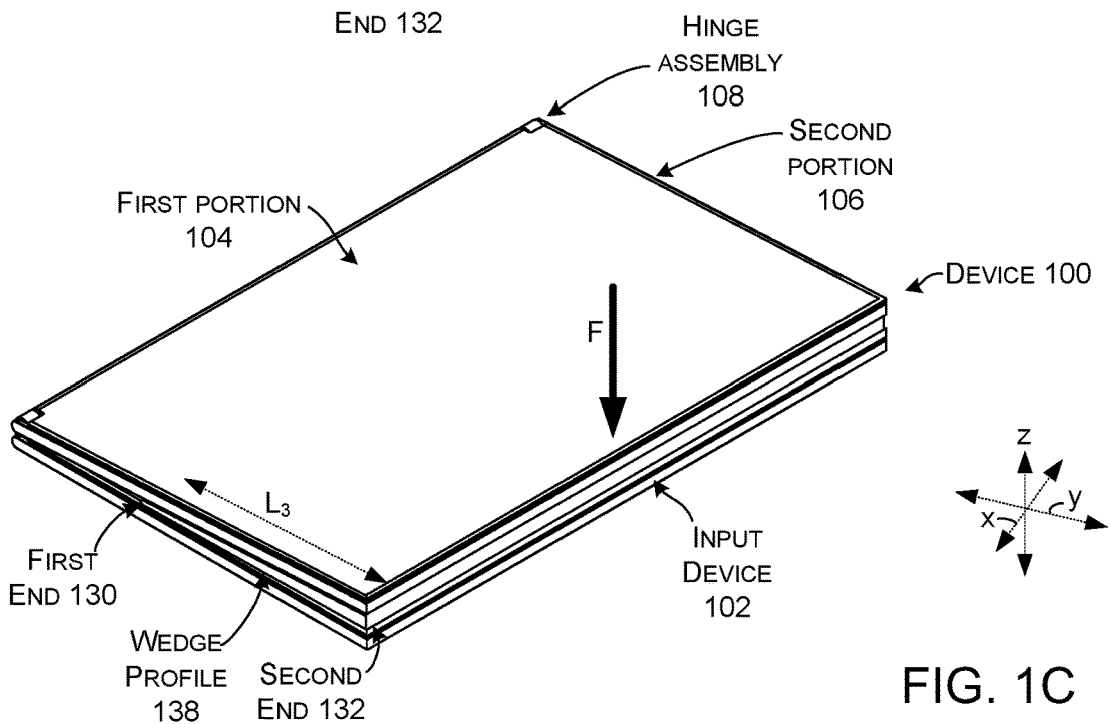

Introductory FIGS. 1A-1C shows an example device 100 and an associated input device 102 that can communicate with device 100. In this example, the associated input device 102 is a wireless detachable input device that can communicate with device 100 via one or more wireless technologies, such as Bluetooth, and/or near field communication (NFC), among others. The device 100 has first and second portions 104 and 106 that are rotatably secured together by a hinge assembly 108.

The first portion 104 can extend from a hinge end 110 to a distal end 112 to define a length $L_1$. The second portion 106 also can extend from a hinge end 114 to a distal end 116 to define a length L2. The first portion can define a width $W_1$ and the second portion can define a width W2.

The first portion 104 can include opposing first and second major planar surfaces 118 and 120 (hereinafter, first and second surfaces). Similarly, the second portion 106 can include opposing first and second major planar surfaces 122 and 124 (hereinafter, first and second surfaces). (Note the second surfaces 120 and 124 are facing away from the viewer and as such are not directly visible in this view, but similar surfaces are visible in FIGS. 2A-2C).

In some implementations, displays 126 are supported by housing 128 (e.g., first portion housing 128(1) and second portion housing 128(2)). For example, the displays 126 can be positioned on the first and/or second surfaces 118, 120, 122, and/or 124, respectively. In the illustrated configuration, the displays 126 are positioned on first surfaces 118 and 122, respectively. The displays can be rigid displays (e.g., include a planar glass layer) or can be flexible displays. For instance, a single flexible display could span the first and second portions 104 and 106 as well as the hinge assembly 108.

The hinge assembly 108 can allow the first and second portions to rotate through a range of rotations, such as from the first surfaces 118 and 122 proximate to one another to the second surfaces 120 and 124 proximate to one another, for example.

In this example, the input device 102 is manifest as a keyboard device. In other implementations, the input device can be manifest as a trackpad or game controller, among others. The input device 102 has a first end 130 and a second end 132 and opposing major surfaces 134 (facing upwardly) and 136 (facing downwardly and away from the reader). The input device 102 can define a width $W_3$ and a length $L_3$. The first end 130 can have a thickness $T_1$ and the second end 132 can have a thickness $T_2$. The input device 102 can have a wedge profile 138 that tapers from the first end 130 (e.g., thinner end) to the second end 132 (e.g., thicker end) (e.g., wedge-shaped input device).

The input device 102 can also include alignment assemblies 140. Similarly, the device 100 can include alignment assemblies 142. (Alignment assemblies 140 and 142 are shown in ghost (e.g., dotted lines) to indicate they likely would not be visible to the user).

FIG. 1A shows the device 100 with the first and second portions 104 and 106 oriented at slightly more than 90 degrees. In this case, the input device 102 is physically separated from (but in range to communicate with) device 100.

FIG. 1B shows the first and second portions 104 and 106 at the same orientation as FIG. 1A. However, in this case, input device 102 is positioned on second portion 106 of device 100.

The alignment assemblies 140 and 142 can function cooperatively to bias the position of the input device 102 relative to second portion 106. In this case, alignment assemblies 140(1) and 140(2) interact with alignment assemblies 142(1) and 142(2), respectively to bias the input device to specific relative positions and orientations relative to the second portion 106. For instance, the alignment assemblies 140 and 142 can bias the input device to a defined distance from the hinge assembly 108 in the y-reference direction and the x-reference direction (e.g., align the edges and/or the centers). Other implementations may dedicate alignment assemblies for biasing in the x-reference direction and dedicate others for biasing in the y-reference direction. In this example, the alignment assemblies 140 and 142 are manifest as magnets.

FIG. 1C shows the first and second portions 104 and 106 rotated to the zero-degree or closed orientation (e.g., closed on input device 102). Note that the input device's wedge profile 138 can ensure that the first and second portions 104 and 106 contact the input device along the wedge profile from the first end 130 to the second end 132 (e.g., along its length $L_3$). The wedge profile 138 can more fully support the first and second portions 104 and 106. This support can reduce or eliminate damage from downward forces (represented by arrow F) on the first portion. For instance, such forces may be encountered when the device is shoved into a backpack and/or when a user leans back on the backpack. In previous designs, the first and second portions tended to contact the input device at a single point or along a single line that is parallel to the hinge axis (e.g., the x-reference axis). This created a torque arm or cantilever such that the force likely caused damage to the displays (e.g., cracking) and/or damaged the hinge assembly. The wedge profile thus protects the device 100 from damage when closed on the input device 102. Stated another way, in previous designs such damage could occur when the displays contacted a small region of the input device and were subject to damaging stresses that could cause display breakage. These previous designs could impart leverage against the hinge assembly that would cause failure of the hinge assembly. In contrast, the wedge profile avoids such concentrations of stress forces and protects the device 100 and/or the input device 102.

FIGS. 2A-2D collectively show details of another example device 100A and associated input device 102A. In this example, the input device 102A can be a wireless input device or a wired input device. For instance, in a wired input device implementation, electrical conductors (not shown) could extend from the distal end 116A of the second portion into the second end 132A of the input device 102A. The conductors could provide power and/or data connectivity with the input device.

Figure 2A:
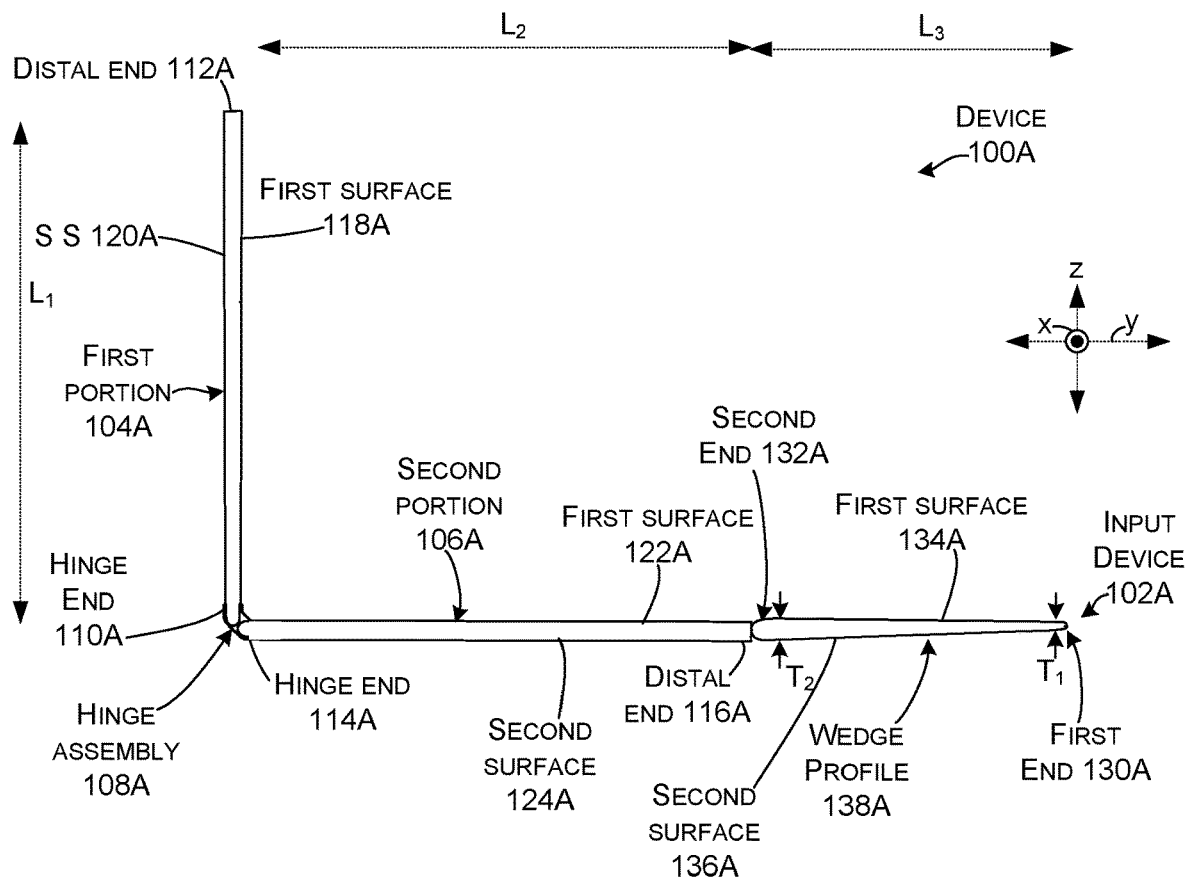
FIGS. 2A-2D, 3, and 4 show side elevational views of example devices and associated wedge-shaped input devices in accordance with some implementations of the present concepts.
Figure 2B:
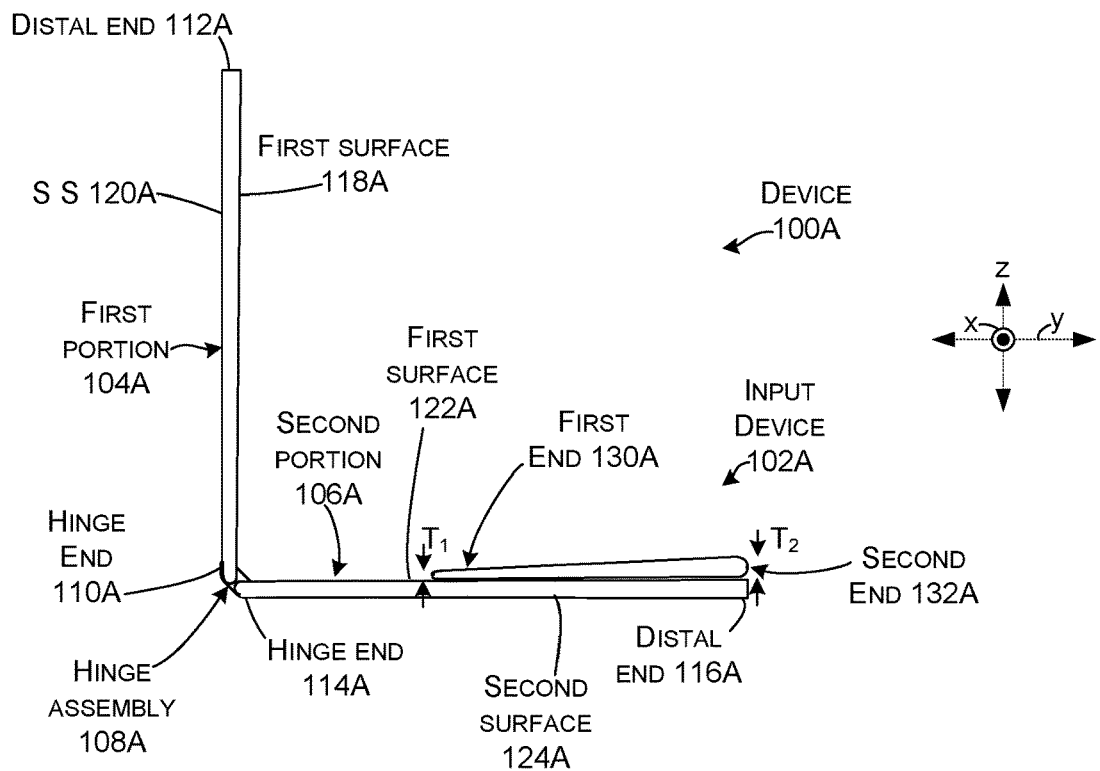
Figure 2C:
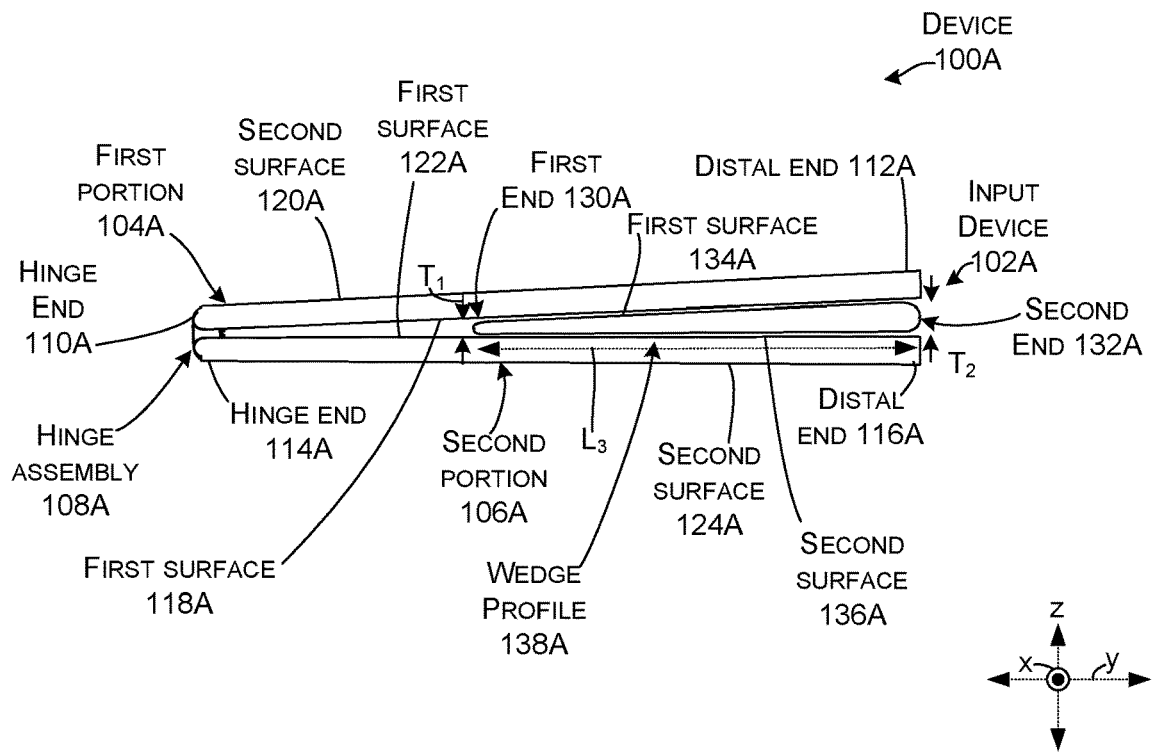
Figure 2D:
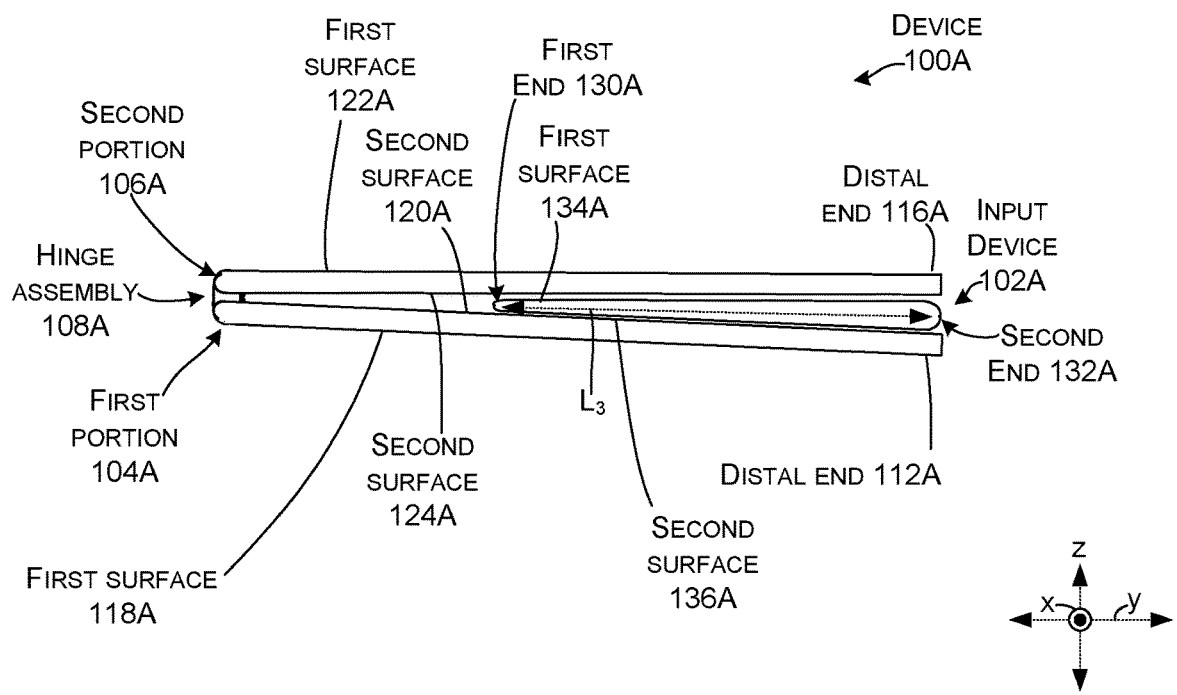

FIGS. 2A-2D are side views taken along the hinge axis. FIGS. 2A and 2B show the first and second portions 102A and 104A oriented at 90 degrees relative to one another. FIG. 2C shows the first portion closed against the second portion in a zero-degree orientation. FIG. 2D shows the first portion closed against the second portion in a 360-degree orientation.

In this implementation, the second end 132A of the input device 102A is rotatably secured (e.g., hinged) to the distal end 116A of second portion 106A. FIG. 2A shows the input device oriented out in front of the second portion. FIG. 2B shows the input device rotated 180 degrees counter-clockwise until its first surface 134A is positioned against first surface 122A of second portion 106A. As such, the thinner first end 130A (e.g., thickness $T_1$) is positioned relatively closer to the second portion's hinge end 114A (e.g., from the hinge assembly 108A) and the thicker second end 132A (e.g., thickness $T_2$) is positioned relatively farther from to the second portion's hinge end 114A. This wedge-shaped configuration with the thinner end proximate to the hinge assembly can allow the first portion and the second portion to be shut without risk of damage. Such an example is shown in FIG. 2C.

FIG. 2C shows the first and second portions 104A and 106A closed against the wedge-shaped input device 102A. In this case, the first portion's first surface 118A contacts the input device's first surface 134A along the length $L_3$ of the input device (e.g., the first surface 118A is planar and co-extensive with first surface 134A, which is also planar). Similarly, the second portion's first surface 122A contacts the input device's second surface 136A along the length $L_3$ (e.g., they are planar and co-extensive). This configuration offers protection to the input device 102A, user convenience through a smaller form factor (e.g., smaller footprint for transport), and/or reduces or eliminates potential damage to the first and second portions if they are forced together.

FIG. 2D shows another orientation where input device 102A is rotated 360 degrees clockwise from FIG. 2C and the first portion 104A is rotated 360 degrees counter-clockwise (e.g., second portion 106A is now on the top and the first portion is on the bottom). At this point, the first portion's second surface 120A is positioned against the input device's second surface 136A and the second portion's second surface 124A is positioned against the input device's first surface 134A. Again, in this orientation, the surfaces of the first and second portions and the input device are planar and co-extensive. As with the orientation of FIG. 2C, this orientation offers protection to the input device, reduced footprint for transport, and/or reduced risk of damage to the first and second portions and the hinge assembly. Such advantages can also be achieved with other input device configurations. One such configuration is illustrated relative to FIG. 3.

Figure 3:
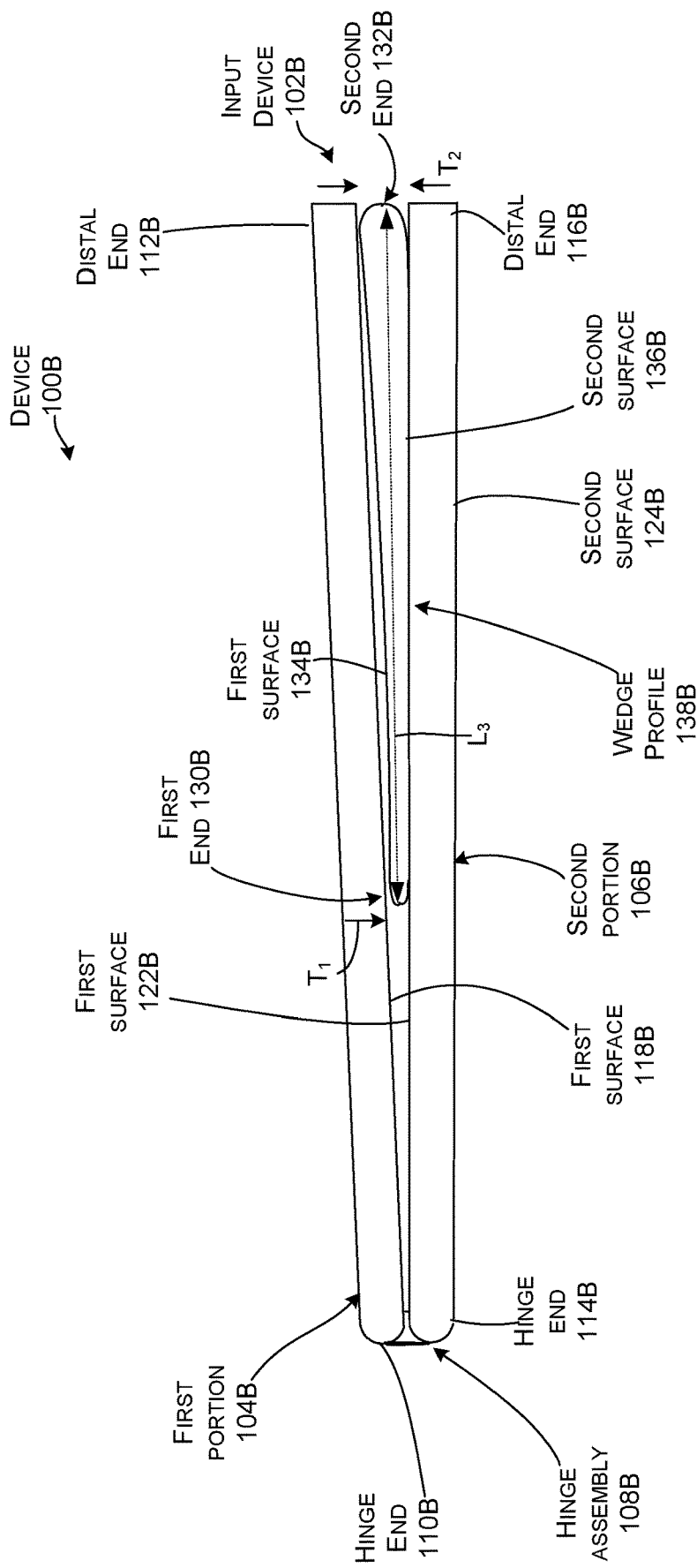

FIG. 3 shows another example device 100B and associated input device 102B. FIG. 3 is similar to the view of FIG. 2C with the first and second portions 104B and 106B closed against input device 102B at a zero-degree orientation. In this case, the input device's first surface 134B is not planar. In this example the first surface 134B is generally curved from the first end 130B to the second end 132B. Thus, while the first portion's first surface 122B does not contact all of first surface 134B along its length $L_3$, the first portion's first surface 122B does simultaneously contact first surface 134B at both ends of the input device (e.g., at the first end 130B and the second end 132B). This configuration can eliminate the cantilevered torque arm effect described above in relation to previous technologies. As such, this implementation can offer protection to the input device, reduced footprint during transportation of the device, and/or reduced risk of damage to the first and second portions and the hinge assembly. Note, that this discussion of first surface 134B can also be applied to the input device's second surface 136B.

Figure 4:
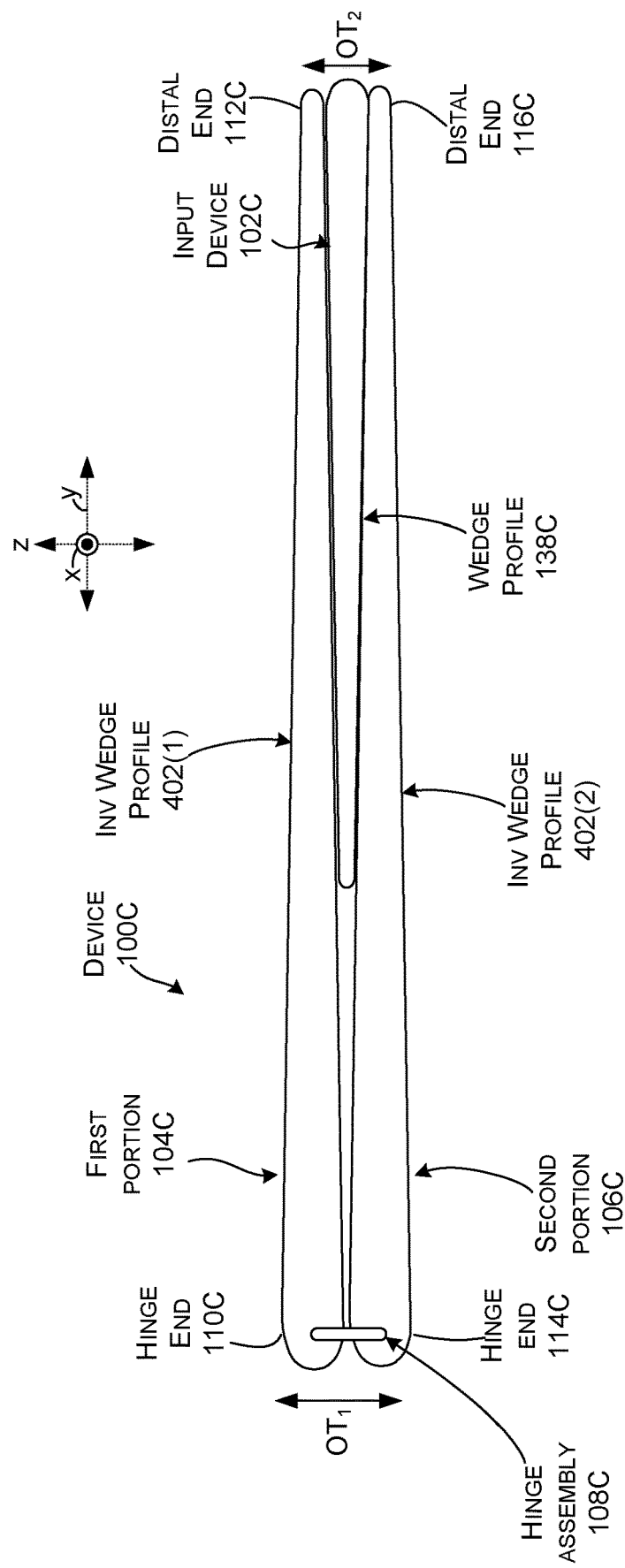

FIG. 4 shows still another example device 100C and associated input device 102C. In this case, the device 100C has a profile when closed on the input device 102C where an overall thickness ($OT_1$) at the hinge end is equal to or greater than an overall thickness ($OT_2$) at the distal end. This configuration can be achieved by the first and second portions 104C and 106C having an inverse wedge profile to the input device 102C. Thus, the first and second portions are thicker at their hinge ends and thinner at their distal ends. The wedge profile 138C of the input device is thinner proximate to the device's hinge assembly 108C and thicker at the distal ends 112C and 116C.

The present device concepts can be utilized with any type of hinged devices and associated input devices, such as but not limited to notebook computers, smart phones, wearable smart devices, tablets, and/or other types of existing, developing, and/or yet to be developed devices.

Various methods of manufacture, assembly, and/or use for these hinged devices and associated input devices are contemplated beyond those shown above relative to FIGS. 1A-3.

Although techniques, methods, devices, systems, etc., pertaining to hinged devices and associated input devices are described in language specific to structural features and/or methodological acts, it is to be understood that the subject matter defined in the appended claims is not limited to the specific features or acts described. Rather, the specific features and acts are disclosed as example forms of implementing the claimed methods, devices, systems, etc.

Various device examples are described above. Additional examples are described below. One example includes a device comprising a first portion associated with a first planar display and a second portion associated with a second planar display, a hinge assembly rotatably securing the first portion and the second portion through a range of orientations from a first closed orientation with the first display and the second display facing toward one another to a second closed orientation with the first display and the second display facing away from one another, and a wireless detachable input device having first and second major planar surfaces that are non-parallel to one another, and in the closed orientation the first planar display is parallel to and in contact with the first major surface and the second planar display is parallel to and in contact with the second major surface.

Another example can include any of the above and/or below examples where in the second closed orientation, the first planar display is parallel to the second major surface and the second planar display is parallel to the first major surface.

Another example can include any of the above and/or below examples where the wireless detachable input device comprises a keyboard, a touch pad, or a game controller.

Another example can include any of the above and/or below examples where the hinge assembly defines at least one hinge axis and the first portion and the second portion have widths measured along the hinge axis.

Another example can include any of the above and/or below examples where a width of the wireless detachable input device is equal to the widths of the first and second portions.

Another example can include any of the above and/or below examples where a width of the wireless detachable input device is less than the widths of the first and second portions.

Another example can include any of the above and/or below examples where the wireless detachable input device has a length that is perpendicular to the widths and wherein the first and second portions simultaneously contact a majority of the length of the wireless detachable input device.

Another example can include any of the above and/or below examples where the wireless detachable input device has a width and wherein the wireless detachable input device includes an alignment assembly along the width that interacts with an assembly on the second portion to automatically align the wireless detachable input device with the second portion.

Another example can include any of the above and/or below examples where the alignment assembly of the wireless detachable input device comprises magnets.

Another example can include any of the above and/or below examples where the alignment assembly of the wireless detachable input device biases a center of the width of the assembly of the wireless detachable input device to a center of the width of the second portion.

Another example can include any of the above and/or below examples where the alignment assembly of the wireless detachable input device biases an edge of the wireless detachable input device to an edge of the second portion.

Another example can include any of the above and/or below examples where the wireless detachable input device includes another alignment assembly that biases the wireless detachable input device a defined distance on the second portion from the hinge assembly.

Another example can include any of the above and/or below examples where the alignment assembly of the wireless detachable input device and the another alignment assembly of the wireless detachable input device are the same alignment assembly or are different alignment assemblies.

Another example includes a device comprising a first portion associated with a first planar display and a second portion associated with a second planar display, a hinge assembly rotatably securing the first portion and the second portion through a range of orientations starting with a closed orientation with the first display and the second display facing toward one another, and a wedge-shaped input device having first and second major non-parallel planar surfaces and comprising alignment assemblies that automatically align the wedge-shaped input device to the second portion so that in the closed orientation the first planar display is parallel to the first major surface and the second planar display is parallel to the second major surface.

Another example can include any of the above and/or below examples where the alignment assemblies bias the wedge-shaped input device a defined distance from the hinge assembly.

Another example includes a device comprising a first portion and a second portion, a hinge assembly rotatably securing the first portion and the second portion through a range of orientations, and a wedge-shaped input device extending between a first end having a first thickness and a second end having a second greater thickness, and in a closed orientation the first and second portions simultaneously contact the first end and the second end.

Another example can include any of the above and/or below examples where the alignment assemblies bias the wedge-shaped input device a defined distance from the hinge assembly.

Another example can include any of the above and/or below examples where the alignment assemblies bias the wedge-shaped input device so that the first end is a defined distance from the hinge assembly.

Another example can include any of the above and/or below examples where the alignment assemblies bias the position and orientation of the wedge-shaped relative to the second portion of the device.

Another example can include any of the above and/or below examples where an overall thickness of the first and second portions is greater proximate to the hinge assembly and lesser distal from the hinge assembly, or an overall thickness of the first and second portions is equal proximate to the hinge assembly and distal from the hinge assembly, or an overall thickness of the first and second portions is lesser proximate to the hinge assembly and greater distal from the hinge assembly.

The invention claimed is:

1. A device, comprising:
 a first portion associated with a first planar display, the first portion extending between a first hinge end and a first distal end;
 a second portion associated with a second planar display, the second portion extending between a second hinge end and a second distal end;
 a hinge assembly rotatably securing the first hinge end of the first portion and the second hinge end of the second portion through a range of orientations from a first closed orientation with the first planar display and the second planar display facing toward one another to a second closed orientation with the first planar display and the second planar display facing away from one another; and,
 a wireless detachable input device extending between a thicker end and a thinner end, the thicker end of the wireless detachable input device rotatably secured to the second distal end of the second portion, the wireless detachable input device having a first major surface and a second major surface that are not parallel to each other,
 in the first closed orientation, the first planar display of the first portion is in contact with the first major surface of the wireless detachable input device at least at the thinner end, and the second planar display of the second portion is in contact with the second major surface of the wireless detachable input device at least at the thinner end, such that stress forces applied to the first portion are distributed through the wireless detachable input device and across the second portion; and in the second closed orientation, the first portion is in contact with the second major surface of the wireless detachable input device, and the second portion is in contact with the first major surface of the wireless detachable input device.

2. The device of claim 1, wherein in the second closed orientation, the first planar display is parallel to the second major surface and the second planar display is parallel to the first major surface.

3. The device of claim 1, wherein the wireless detachable input device comprises a keyboard, a touch pad, or a game controller.

4. The device of claim 1, wherein the hinge assembly defines at least one hinge axis and the first portion and the second portion have widths measured along the hinge axis.

5. The device of claim 4, wherein a width of the wireless detachable input device is equal to the widths of the first and second portions.

6. The device of claim 4, wherein a width of the wireless detachable input device is less than the widths of the first and second portions.

7. The device of claim 4, wherein the wireless detachable input device has a length that is perpendicular to the widths and wherein the first and second portions simultaneously contact a majority of the length of the wireless detachable input device.

8. The device of claim 6, wherein the wireless detachable input device has a width and wherein the wireless detachable input device includes an alignment assembly along the width that interacts with an assembly on the second portion to automatically align the wireless detachable input device with the second portion.

9. The device of claim 8, wherein the alignment assembly of the wireless detachable input device comprises magnets.

10. The device of claim 8, wherein the alignment assembly of the wireless detachable input device biases a center of the width of the assembly of the wireless detachable input device to a center of the width of the second portion.

11. The device of claim 8, wherein the alignment assembly of the wireless detachable input device biases an edge of the wireless detachable input device to an edge of the second portion.

12. The device of claim 8, wherein the wireless detachable input device includes another alignment assembly that biases the wireless detachable input device a defined distance on the second portion from the hinge assembly.

13. The device of claim 12, wherein the alignment assembly of the wireless detachable input device and the another alignment assembly of the wireless detachable input device are the same alignment assembly or are different alignment assemblies.

14. The device of claim 1, wherein the first distal end of the first portion does not contact the second distal end of the second portion in the first closed orientation.

15. The device of claim 1, wherein:
the first major surface of the wireless detachable input device is curved from the thinner end to the thicker end; and
in the first closed orientation, the first planar display of the first portion contacts the first major surface of the wireless detachable input device at the thinner end and at the thicker end but does not contact all of the first major surface of the wireless detachable input device.

16. The device of claim 1, wherein an overall hinge thickness including the first hinge end of the first portion and the second hinge end of the second portion is lesser than an overall distal thickness including the first distal end of the first portion, the thicker end of the wireless detachable input device, and the second distal end of the second portion when the first portion and the second portion are closed around the wireless detachable input device.

17. A device, comprising:
a first portion associated with a first display, the first portion extending between a first hinge end and a first distal end;
a second portion associated with a second display, the second portion extending between a second hinge end and a second distal end;
a hinge assembly rotatably securing the first hinge end of the first portion and the second hinge end of the second portion through a range of orientations starting with a first closed orientation with the first display and the second display facing toward one another and ending with a second closed orientation with the first display and the second display facing away from each other; and,
an input device being wedge-shaped and extending between a thicker end and a thinner end, the input device rotatably secured to the second distal end of the second portion, the input device having a first major planner surface and second major planar surface that are not parallel to each other, the input device comprising magnetic alignment assemblies that automatically align the input device to the second portion,
in the first closed orientation, the first display of the first portion contacts the first major surface of the input device at least at the thinner end, and the second display of the second portion contacts the second major surface of the input device at least at the thinner end, such that stress forces applied to the first portion are distributed through the input device and across the second portion; and
in the second closed orientation, the first portion contacts the second major surface of the input device, and the second portion contacts the first major surface of the input device.

18. The device of claim 17, wherein the magnetic alignment assemblies bias the input device a defined distance from the hinge assembly.

19. The device of claim 17, wherein the first display and the second display comprise a single display.

20. The device of claim 17, wherein the first display does not contact the second display in the first closed orientation.

21. The device of claim 17, wherein:
the first major surface of the input device is curved from the thinner end to the thicker end; and
in the first closed orientation, the first display of the first portion contacts the first major surface of the input device at the thinner end and at the thicker end but does not contact all of the first major surface of the input device.

22. The device of claim 17, wherein an overall hinge thickness including the first hinge end of the first portion and the second hinge end of the second portion is lesser than an overall distal thickness including the first distal end of the first portion, the thicker end of the input device, and the second distal end of the second portion when the first portion and the second portion are closed around the input device.

23. A device, comprising:
a first portion extending between a first hinge end and a first distal end;

a second portion extending between a second hinge end and a second distal end;

a hinge assembly rotatably securing the first hinge end of the first portion and the second hinge end of the second portion through a range of orientations from a 0-degree orientation to a 360-degree orientation; and an input device having a first surface and a second surface extending between a thicker end and a thinner end, the thicker end of the input device being rotatably secured to the second distal end of the second portion, in the 0-degree orientation, the first portion contacts the first surface of the input device at least at the thinner end, and the second portion contacts the second surface of the input device at least at the thinner end, such that stress forces applied to the first portion are distributed through the input device and across the second portion; and in the 360-degree orientation, the first portion contacts the second surface of the input device, and the second portion contacts the first surface of the input device.

24. The device of claim 23, wherein an overall hinge thickness including the first hinge end of the first portion and the second hinge end of the second portion is lesser than an overall distal thickness including the first distal end of the first portion, the thicker end of the input device, and the second distal end of the second portion when the first portion and the second portion are closed around the input device.

25. The device of claim 23, wherein the first distal end of the first portion does not contact the second distal end of the second portion in the 0-degree orientation.

26. The device of claim 23, wherein:

the first surface of the input device is curved from the thinner end to the thicker end; and in the 0-degree orientation, the first portion contacts the first surface of the input device at the thinner end and at the thicker end but does not contact all of the first surface of the input device.

* * * * *